May 22, 1923.

W. SCHMID

LEVEL WIND ANTIBACKLASH REEL

Original Filed Feb. 18, 1921 2 Sheets-Sheet 1

Inventor
William Schmid,
By
Attorneys

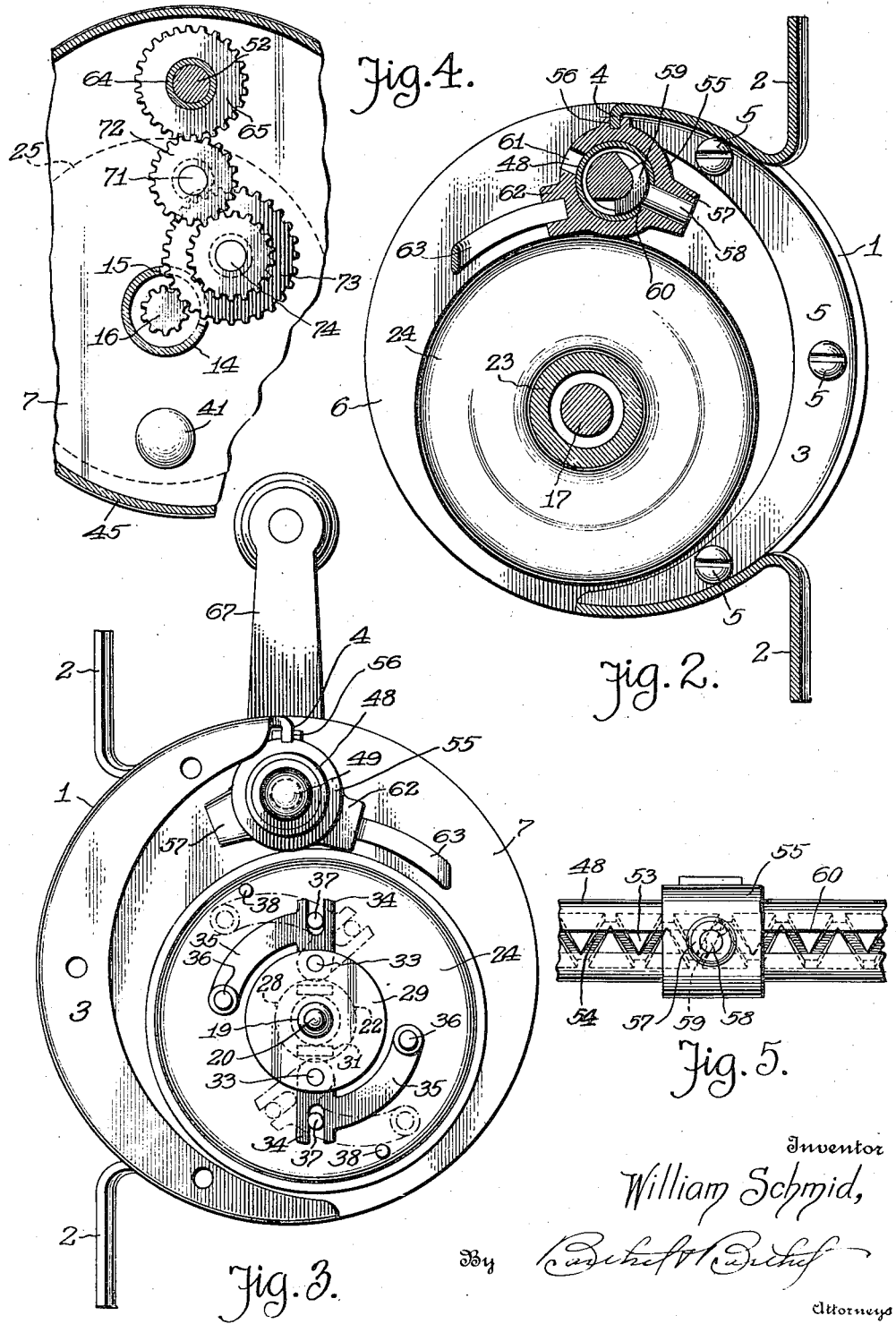

Patented May 22, 1923.

1,456,283

UNITED STATES PATENT OFFICE.

WILLIAM SCHMID, OF COLDWATER, MICHIGAN.

LEVEL-WIND ANTIBACKLASH REEL.

Application filed February 18, 1921, Serial No. 446,142. Renewed April 6, 1923.

*To all whom it may concern:*

Be it known that I, WILLIAM SCHMID, a citizen of the United States of America, residing at Coldwater, in the county of Branch and State of Michigan, have invented certain new and useful Improvements in Level-Wind Antibacklash Reels, of which the following is a specification, reference being had therein to the accompanying drawings.

My invention aims to provide a high grade level wind and anti-back lash reel embodying certain structural features which will facilitate the casting and recovery of a fish line.

First, there is a level winding mechanism embodying a stationary slotted sleeve or pillar; a traversing or sliding guide head; a line guide member; a pinned nut, and a screw provided with diamond threads. These elements are compactly and securely organized and represent the only separable pillar of the wide open reel. The mechanism is particularly characterized by the traversing or sliding guide head being guided in its transverse movement by a portion of the reel frame, so that the line guide member will have a defined path of travel relative to the spool of the reel. The mechanism is further characterized by the pinned nut which cannot become accidentally displaced, and the novel manner of mounting the stationary slotted sleeve or pillar relative to the threaded screw reduces friction to a minimum and insures ease of lubrication and response to any actuation by the line of the spool or the driving mechanism thereof. The above described level winding mechanism forms the subject matter of my copending application No. 557,287, filed Aug. 29, 1922.

Second, there is a novel anti-back lash mechanism associated with the spool and including a spool shaft; shaft head; cam rollers, and governor arms. This particular association of elements is characterized by the governor mechanism being housed in one of the end members of the spool, by the governor mechanism causing lateral shifting of the spool, and by an adjustable drag at the opposite end of the spool for producing a braking action against the spool when under-running a cast line.

Briefly considering what may be accomplished by using my improved reel the following may be mentioned.

I am able to cast a fish line without "thumbing" the reel. This is brought about by the governor mechanism. When the cast line strikes the surface of the water there is a slackness of the line which ordinarily causes the spool to under-run the line and when the spool is released from the pull of the line a centrifugal force is exerted on the governor arms causing the governor arms to circumferentially shift the spool relative to its shaft, and such change in the circumferential relation of the spool and shaft causes change in the longitudinal relation of the spool relative to its shaft, the spool being laterally shifted into engagement with the drag producing a braking action which sufficiently retards the spool to prevent a back lash or entanglement of the line on the spool. This action is automatic, without any attention on the part of the caster of the line, and at no time is the driving relation of the spool and its operating mechanism disconnected or momentarily destroyed, consequently the caster may at any time start to recover the line, especially if there is a "strike".

I am able to recover the line with absolute assurance that it will be evenly wound on the spool and this is brought about by the level winding mechanism which is operated in synchronism with the spool.

The mechanism entering into my reel will be hereinafter specifically described and then claimed, and reference will now be had to the drawings, wherein Figure 1 is a longitudinal sectional view of the level wind anti-backlash reel with portions thereof in elevation;

Fig. 2 is a central cross sectional view of the reel;

Fig. 3 is an end view of a portion of the reel with one of the heads thereof removed showing the governor mechanism;

Fig. 4 is a cross sectional view of a portion of the reel showing a train of gears forming part of the spool driving mechanism;

Fig. 5 is a rear elevation of a portion of the level wind mechanism;

Figure 1:
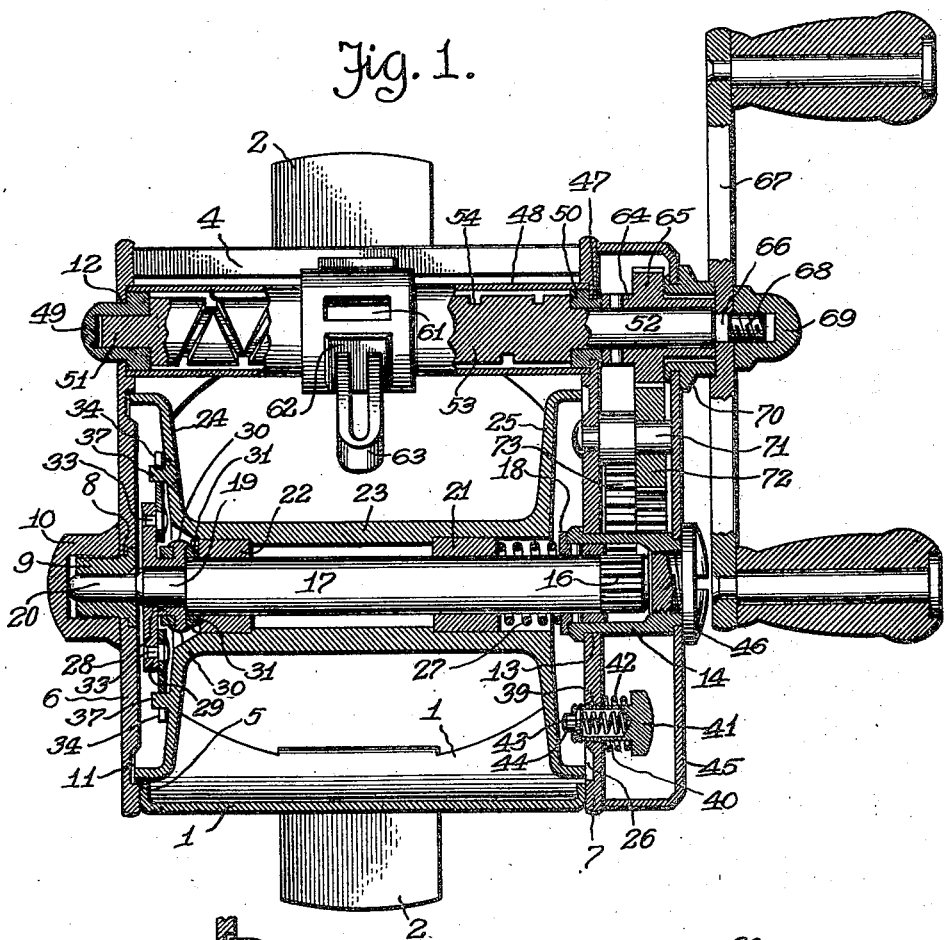
Figure 6:
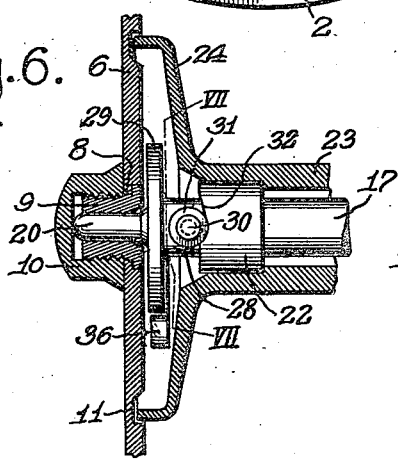
Fig. 6 is a horizontal sectional view of a portion of the spool further illustrating the governor mechanism.
Figure 7:
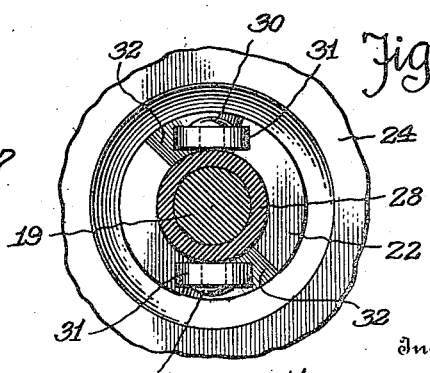
Fig. 7 is an enlarged cross sectional view taken on the line VII—VII of Fig. 6.

In describing my invention by aid of the views above referred to, I desire to point out that the same are intended as merely illustrative of a reel by which my invention may be put into practice, and it is to be understood that the structural elements are susceptible to such changes, in size, shape and manner of assemblage as fall within the scope of the appended claims.

In the drawings, the reference numeral 1, denotes a semi-cylindrical reel frame which has the curved walls cut and stamped to afford opposed longitudinally alining reel seat members 2, and the ends of the reel frame 1 are provided with apertured end flanges 3. The front longitudinal edge of the frame 1 is bent to provide a guide rib 4 for the level wind mechanism of the reel, and connected to the end flanges 3 by screws 5 or other fastening means are heads 6 and 7, which cooperate with the reel frame in providing a wide open reel.

The head 6 has an eccentrically disposed opening 8, and mounted in said opening is the flanged inner end of a spool shaft bearing 9 which is exteriorly screwthreaded for a cap or nut 10, said nut bearing against the outer face of the head 6 and anchoring the spool shaft bearing 9 relative to said head. The inner face of the head 6 has the usual annular spool groove 11 and said head adjacent the rib 4, has a stepped or shouldered opening 12 which will be hereinafter referred to.

The head 7 has an opening 13 about the same axis as the opening 8 of the head 6 and in the opening 13 is mounted a barrel 14 which has its wall slotted, as at 15 so as to expose a spool pinion 16 forming part of a spool shaft 17 provided with a fixed flanged collar 18 journaled in the inner end of the barrel 14. The collar 18 abuts the inner end of the barrel 14, serves as a spring abutment and prevents longitudinal shifting of the spool shaft 17. The opposite end of the spool shaft 17 is reduced to provide a shank 19 and a pintle 20, said pintle being journaled in the spool bearing 9 of the head 6.

Rotatable on the spool shaft 17 are bushings 21 and 22 fixed in a spool sleeve 23, this spool sleeve having end members 24 and 25 with the end member 24 confronting the head 6 and the end member 25 confronting the head 7. The peripheral edge of the end member 24 extends into the annular groove 11 of the head 6, and the peripheral edge of the end member 25 is adapted to enter an annular groove 26 provided therefor in the face of the head 7. The end members 24 and 25 cooperate with the spool sleeve 23 in providing a spool or holder for a fish line which may be suitably attached to the spool and wound on the spool.

The bushing 21 serves as a spring abutment for a spiral spring 27 surrounding the spool shaft 17, between the bushing 21 and the flanged end of the collar 18, and the expansive force of the spring 27 maintains the spool sleeve 23 normally at a pintle end of the spool shaft 17, but permits of the spool sleeve being laterally shifted towards the head 7, as will hereinafter appear.

Suitably fixed on the shank 19 of the spool shaft 17 is the hub portion 28 of a shaft head or disk 29 and the hub portion 28 is provided with diametrically opposed stub shafts 30 for cam rollers 31, said rollers confronting the end of the bushing 22, which has its end wall provided with cam surfaces 32. Since the hub portion 28 of the head 29 is fixed on the shank 19, and the shaft 17 held against lateral movement, it is obvious that the spool sleeve 23 will be laterally shifted towards the head 7 by the cam rollers 31, this movement being against the expansive force of the spring 27 which is placed under additional tension so that the expansive force of the spring may restore the spool sleeve 23 to normal position, as shown in Fig. 1.

Pivotally connected to the shaft head 29, as at 33, are the inner slotted ends 34 of diametrically opposed segment shaped arms 35. These governor arms have the outer ends thereof provided with contacting members 36 adapted to frictionally engage the periphery of the shaft head 29, when the governor arms 35 are rocked on their pivots. The inner slotted ends 34 of the governor arms 35 loosely engage studs 37, carried by the end member 24 of the spool sleeve 23, and this particular end member has stops 38 to limit the outward movement of the outer ends of the governor arms 35, when actuated by centrifugal force. By reference to Figs. 1 and 3 it will be noted that the governor arms 35 are positioned between the shaft head 29 and the end member 24 so that there may be a relative movement of the spool end member and the shaft head 29, the movement being circumferential in direction and defined by the contact members 36 engaging the head 29 or the stops 38 of the end member 24. When the head 29 imparts movement to the spool end member 24, the contact members 36 engage the periphery of the head 29 and by reason of the inner ends of the governor arms 35 remaining in engagement with the studs 37, a driving relation is established between the head 29 and the spool end member 24. When the spool is driven by a cast line the same driving relation is established, but when the spool under-runs the line and is no longer driven thereby then the centrifugal force set up by the rapidly revolving spool causes the governor arms 35 to be swung into engagement with the stops 38, establishing another relation between the shaft head 29 and the end member 24. The previous relation was such as to maintain the cam rollers 31 in the depths of the cam surface 32 on the end of the bushing 22, but the new relation between the shaft head 29 and the end member 24 causes the cam rollers 31 to ascend the rises of the cam surface 32, thereby shifting the bushing 22 away from the rollers, causing the spool sleeve 23 to be shifted towards the head 7 and against the action of the spring 27.

The spool sleeve 23 is laterally shifted towards the head 7 for the purpose of retarding and eventually stopping the rotary movement of the spool sleeve when under running a cast line. To retard and brake the action of the sleeve 23, the head 7 is provided with an opening 39 having its walls screw threaded to receive an exteriorly screwthreaded hollow drag head member 40 provided with a nut or head 41 to facilitate rotation of the drag member and adjustment thereof in the opening 39. A coiled spring 42 encircles the drag member, between the head 7 and the head 41 to serve as a lock and prevent accidental rotation of the drag member. In the drag member 40 is a coiled expansion spring 43 bearing against a contact member 44 which is yieldably held by the spring 43 within the drag member, said drag member having its outer end peened or flanged to retain the contact member 44 in the drag member. The contact member 44 protrudes sufficiently from the drag member to be engaged by the end member 25 of the spool sleeve 23, when said spool sleeve is shifted towards the head 7, and with the annular groove 26 of greater depth than the annular groove 11, there will be clearance for the peripheral edge of the end member 25 when the spool sleeve is shifted.

Detachably mounted against the outer face of the head 7 is a gear housing 45 and with this gear housing detachable access may be had to the drag member head or nut 41 for adjusting the drag member in the head 7 to compensate for wear on the contact member 44 and regulate the braking action. The gear housing 45 has an opening to receive the outer end of the barrel 14 and a large head screw 46 is mounted in the end of the barrel 14 with the head of the screw overlying the wall of the gear housing 45, so that the gear housing is anchored relative to the head 7 and the barrel 14 fixed between the gear housing 45 and the head 7.

Before considering the driving mechanism of the spool, reference will be had to the level winding mechanism located adjacent the rib 4. The head 7 has an opening 47 longitudinally alining with the opening 12 and mounted in the confronting ends of the openings 12 and 47 is a stationary longitudinally slotted sleeve or pillar 48. In one end of the stationary sleeve 48 is a spindle bearing 49 fitted in and projecting from the opening 12 of the head 6, and mounted in the opposite end of the sleeve 48 and fixed in the opening 47 of the head 7 is another spindle bearing 50. The spindle bearings 49 and 50 receive the spindles 51 and 52 of a screw shaft 53 provided with a diamond thread 54 of a conventional form for moving a nut or member back and forth on the shaft 53 when said shaft is revolved.

Slidable on the stationary sleeve 48 is a traversing or sliding tubular guide head 55 having a groove 56 to receive the rib 4 of the reel frame 1. Instead of the groove 56 there may be opposed upstanding flanges at the sides of the rib 4 and said rib prevents turning of the traversing guide heads during the longitudinal movement thereof on the stationary sleeve 48.

At one side of the guide head 55 is a socket 57 to receive the pin 58 of a nut 59, said nut being placed in the sleeve 48 with its end 58 extending through the longitudinal slot 60 of the sleeve 48. The nut 59 is also placed in position through an opening 61 in the opposite side of the guide head 55 from the socket 57, and said nut is adapted to engage in the diamond thread 54 of the screw shaft 53 and cause a traversing movement of the guide head 55 when the screw shaft 53 is revolved.

Adjacent the opening 61 of the guide head 55 is a socket 62 for a line guide member 63, said line guide member being somewhat U-shaped and curved so that a line may readily pass through the guide member when being wound on the reel spool or cast therefrom.

The shaft spindle 52 is of sufficient length to extend through the gear housing 45 and mounted on the shaft spindle 52 is a hub portion 64 of a gear 65 within the gear housing 45. The shaft spindle 52 protrudes beyond the hub portion 64 of the gear 65 and has a squared or shank portion 66 for a crank 67, and a threaded portion or tang 68 for a nut 69, said nut preventing displacement of the crank 67 relative to the shaft spindle 52. Providing clearance for the shaft spindle 52 and the hub portion 54 of the gear 65 is a ferrule or escutcheon plate 70 mounted in an opening of the gear housing 45, and the wall of the crank 67 is recessed to receive the end of the ferrule or escutcheon plate 70.

On the outer face of the head 7 is a stub shaft 71 provided with a gear 72 meshing with the gear 65, and a compound gear 73 on another stub shaft 74 of the head 7, said compound gear extending into the slot 15 of the barrel 14 to mesh with the spool shaft pinion 16. The train of gears is housed within the gear housing 45 and provides a compact power transmission from the screw shaft spindle 52 to the spool shaft 17, so that the shafts 17 and 53 may be revolved in unison and in timed relation. The ratio between the gears is such as to cause the level winding mechanism to evenly feed a line on to the reel spool as this spool is revolved through the medium of the crank 67.

It is now apparent from the foregoing that the driving mechanism within the gear housing is employed to operate the level wind mechanism and the reel spool, the latter being operated through the medium of the governor mechanism, which by virtue of the cam arrangement causes the reel spool to be laterally shifted, for a braking action, when the spool under-runs the line. It is this last mentioned feature of my invention to which I attach considerable importance and a careful inspection of the drawing will show that all of the reel parts have been designed to afford a compact construction, manufacture at a comparatively small cost, ease of assembling, and positive control of the fish line when being wound on or unwound from the reel.

What I claim is:—

1. In a fish line reel, a spool, spool driving means at one end of the spool, a drag at the same end of said spool as said spool driving means, and means including a governor adapted to automatically and bodily shift said spool into engagement with said drag, said means being at that end of the spool opposite the spool driving means.

2. A fish line reel as in claim 1, and a gear housing inclosing said drag and spool driving means.

3. In a fish line reel, a laterally and bodily shiftable spool, and a drag, said spool bodily shifting into engagement with said drag when actuated by the underrunning of a line, and means adapted to bodily restore said spool to normal position after having been subjected to the action of said drag.

4. A fish line reel as in claim 3, wherein a governor and cam mechanism are instrumental in bodily moving said spool and placing said means under stress.

5. Means for preventing under-running of a spool relative to a line, comprising in combination with a spool, a mechanism at one end of the spool actuated by centrifugal force to shift said spool, and means at the opposite end of the spool engaged by the shifted spool to retard the under-running action thereof.

6. In a fish line reel, the combination with a frame, heads carried thereby, and a gear housing carried by one of said heads, of a spool shaft supported from said heads, driving means in said gear housing for said spool shaft, a spool loose on said shaft and adapted to bodily shift lengthwise of said shaft, a drag carried by one of said heads adapted to be engaged by lengthwise movement of said spool, and means between the other head and said spool articulating said spool and spool shaft and adapted to shift said spool into engagement with said drag.

7. A fish line reel as in claim 6, characterized by said means including a cam, cam rollers and arms with said arms changing the relation between said spool and spool shaft to effect shifting of said spool.

8. The combination of a spool having end members, a drive shaft loosely supporting said spool, a drag adapted to be engaged by one of the end members of said spool, governor arms articulating the other spool end member and said shaft so that said shaft may drive said spool, said arms being disposed to be actuated by centrifugal force to change the normal relation between said shaft and spool, and means brought into action by such a change of shaft and spool relation to cause lateral movement of said spool towards said drag to be retarded thereby.

9. The combination set forth in claim 8, wherein the last mentioned means includes a cam bushing in said spool and cam rollers supported from said spool shaft.

10. In an anti-back lash reel having a spool shaft and spool, a head on said shaft, governor arms pivotally supported by said head and loosely engaging said spool, said governor arms establishing a driving relation between said spool shaft and spool so that the former may drive the latter and by being subjected to centrifugal force change the normal relation between said head and said spool, and cam means between said head and spool causing lateral movement of said spool for braking purposes when said governor arms are actuated by centrifugal force.

11. In an anti-back lash reel, a shaft, a spool loose on said shaft, means establishing a driving relation between said shaft and spool, and means between said shaft and spool brought into action by excessive speed of said spool to cause lateral movement of said spool for braking purposes.

In testimony whereof I affix my signature in presence of two witnesses.

WILLIAM SCHMID.

Witnesses:
 Mrs. ADA SCHMID,
 WM. H. DAVIS.